United States Patent
Hayashi et al.

(10) Patent No.: US 8,427,663 B2
(45) Date of Patent: Apr. 23, 2013

(54) IMAGE OUTPUTTING APPARATUS HOLDING OUTPUT REQUEST FOR IMAGE DATA

(75) Inventors: Tomonori Hayashi, Kawasaki (JP); Takayuki Hirata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 12/133,075

(22) Filed: Jun. 4, 2008

(65) Prior Publication Data

US 2009/0009780 A1    Jan. 8, 2009

(30) Foreign Application Priority Data

Jul. 2, 2007    (JP) ................................ 2007-173892

(51) Int. Cl.
| | |
|---|---|
| G06F 3/12 | (2006.01) |
| G06F 15/16 | (2006.01) |
| G06F 15/173 | (2006.01) |
| G06F 17/00 | (2006.01) |
| G06F 17/30 | (2006.01) |
| G06K 15/00 | (2006.01) |

(52) U.S. Cl.
USPC ....... 358/1.14; 358/1.13; 358/1.15; 358/1.16; 709/219; 709/223; 709/231; 709/232; 707/668; 707/669; 707/670; 707/671; 707/672; 707/673; 707/674; 707/675; 707/676; 707/677; 707/678; 707/679; 707/680; 707/681; 707/682; 707/683; 707/708

(58) Field of Classification Search .................. None
See application file for complete search history.

(56) References Cited

U.S. PATENT DOCUMENTS

| | | | | |
|---|---|---|---|---|
| 2002/0131059 | A1* | 9/2002 | Tsuchitoi | 358/1.1 |
| 2002/0176108 | A1* | 11/2002 | Jeon | 358/1.15 |
| 2003/0202201 | A1* | 10/2003 | Muto et al. | 358/1.14 |
| 2006/0044593 | A1* | 3/2006 | Kawakami et al. | 358/1.14 |
| 2006/0072154 | A1* | 4/2006 | Kim | 358/1.15 |
| 2006/0218142 | A1* | 9/2006 | Tamura | 707/5 |
| 2007/0058196 | A1* | 3/2007 | Nagahara et al. | 358/1.15 |
| 2007/0216935 | A1* | 9/2007 | Osamura et al. | 358/1.15 |

FOREIGN PATENT DOCUMENTS

JP    2006-239947 A    9/2006

* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

An image outputting apparatus obtains attribute information about image data prior to acquisition of the image data stored in an external apparatus. The image outputting apparatus accepts an output request of the image data by using the attribute information while obtaining the image data. The image outputting apparatus holds the output request in accordance with the acceptance of the output request before completion of acquisition of the image data and allows the outputting the image data in response to the output request after acquisition of the image data has been completed.

18 Claims, 8 Drawing Sheets

IMAGE OUTPUTTING APPARATUS HOLDING OUTPUT REQUEST FOR IMAGE DATA

BACKGROUND OF THE INVENTION

1. Field of the Invention

The present invention relates to an image outputting apparatus to output a series of image data obtained from an external apparatus, a control method, and a storage medium.

2. Description of the Related Art

Conventionally, an image outputting apparatus capable of obtaining image data stored in an external apparatus and outputting the obtained image data has been suggested. For example, Patent Document 1 (Japanese Patent Laid-Open No. 2006-239947) suggests an image forming apparatus capable of restoring data backed up in a server to the apparatus and outputting the restored data from the apparatus.

However, when a user of an image outputting apparatus wants to obtain image data of a plurality of pages stored in an external apparatus and allow the image outputting apparatus to output the image data, the following problem may occur. That is, the user may not be allowed to issue an output request of the image data until acquisition of the image data has been completed in the image outputting apparatus.

SUMMARY OF THE INVENTION

An embodiment of the present invention provides an apparatus capable of accepting an output request (e.g., print request) from a user to output (e.g., print) image data before the image data has been completely obtained from an external apparatus and allows outputting (e.g., printing) of the image data requested by the user after acquisition of the requested image data has been completed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Hereinafter, an embodiment of the present invention is described with reference to the attached drawings. The embodiment described below does not limit the present invention according to the claims, and not all the combinations of features described in the embodiment are essential to the present invention. In the following embodiment, an image forming apparatus having a function of printing image data as a function of outputting image data is described as an example. However, the present invention is not limited to such an image forming apparatus. For example, an information processing apparatus, such as a host computer or a mobile terminal, having a function of transmitting image data or displaying image data as a function of outputting image data may be applied.

Figure 1:
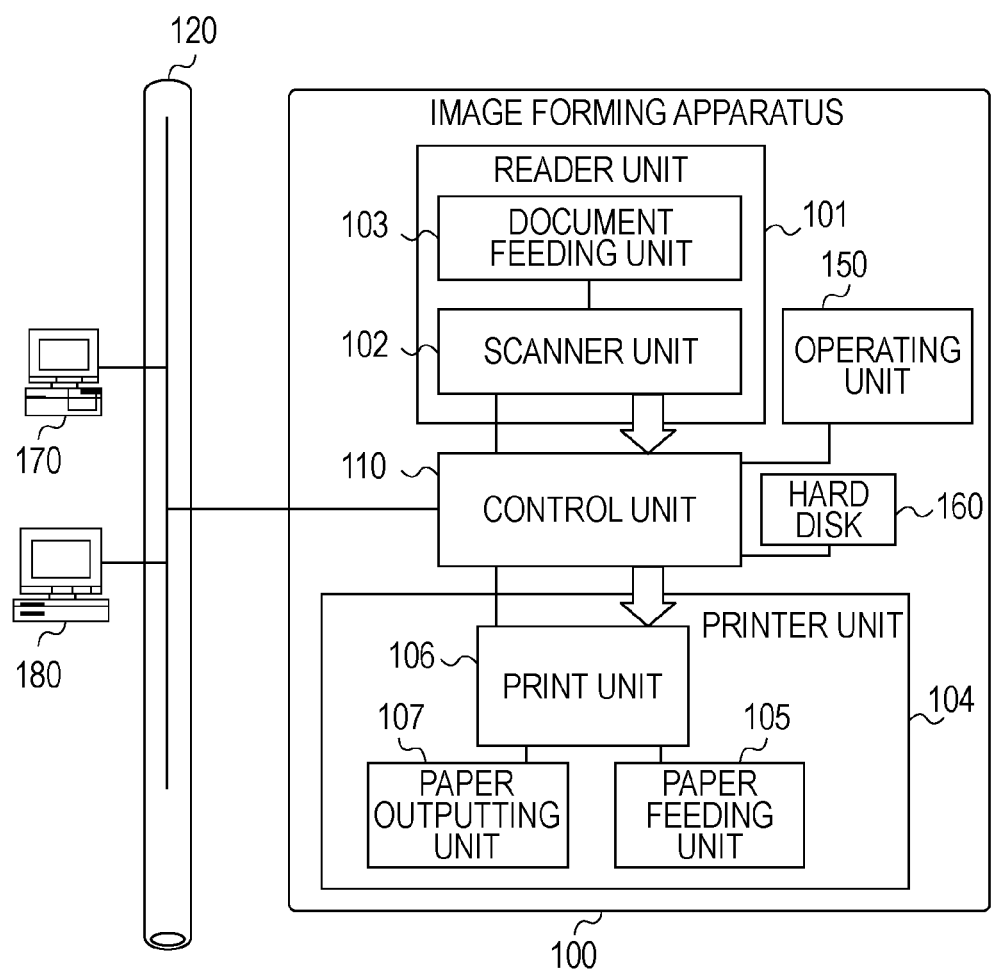
FIG. 1 illustrates a configuration of an image forming apparatus according to an embodiment of the present invention.

FIG. 1 illustrates a configuration of an image forming apparatus 100, which is an example of an image outputting apparatus according to an embodiment of the present invention, and also illustrates a system configuration.

A reader unit 101 optically reads a document image and converts it to image data. The reader unit 101 includes a scanner unit 102 having a function of reading a document and a document feeding unit 103 having a function of conveying document sheets.

A printer unit 104 conveys recording paper, prints image data as a visual image thereon, and outputs the paper. The printer unit 104 includes a paper feeding unit 105 having a plurality of types of recording paper cassettes, a print unit 106 having a function of transferring and fixing image data onto recording paper, and a paper outputting unit 107 having a function of sorting and stapling recording paper on which data has been printed and outputting the paper to the outside of the apparatus.

A control unit 110 electrically connects to the reader unit 101 and the printer unit 104 and also connects to a server 170 and a host computer 180 via a network 120. The control unit 110 controls the reader unit 101 in order to read image data of a document and to store the image data in a hard disk 160, and controls the printer unit 104 in order to print image data on recording paper. The image forming apparatus 100 also has a scanner function of converting image data read by the reader unit 101 to code data and transmitting the code data to the host computer 180 via the network 120, in addition to the copying function. Also, the image forming apparatus 100 has a printer function of converting code data received from the host computer 180 via the network 120 to image data and outputting the image data to the printer unit 104.

The hard disk 160 can store a plurality of series of image data (e.g., box documents described below), each including a plurality of pages, captured through the reader unit 101 and the network 120 and a plurality of pieces of attribute information about the series of image data. When a plurality of series of image data are stored in the hard disk 160, a plurality of pieces of attribute information corresponding to the image data are also stored in the hard disk 160.

An operating unit 150 connects to the control unit 110, is constituted by a liquid crystal touch panel, and functions as a user interface to operate the image forming apparatus 100.

The server 170 is an image database server capable of being accessed from the host computer 180 or another apparatus connected to the network 120 and holding shared documents and shared images in a large capacity hard disk therein as a shared file server.

In this embodiment, the server 170 illustrated in FIG. 1 corresponds to an example of an external apparatus to store series of image data of a plurality of pages. The server 170 can receive a plurality of series of image data and a plurality of pieces of attribute information corresponding to the image data stored in the hard disk 160 from the image forming apparatus 100 via the network 120 and store the image data and attribute information in a memory of the server 170. That is, the server 170 functions as a backup of various data stored in the hard disk 160.

The network 120 functions as a communication medium for data communication between the image forming apparatus 100 and an external apparatus, such as the server 170 or the host computer 180.

The control unit 110 functions as a first obtaining unit to obtain a series of image data of a plurality of pages stored in the server 170 via the network 120.

The printer unit 104 functions as an outputting unit to output the series of image data obtained from the server 170 via the hard disk 160.

The control unit 110 functions also as a second obtaining unit to obtain attribute information about a series of image data from the server 170 via the network 120 prior to acquisition of the series of image data to be obtained from the server 170.

The control unit 110 enables acceptance of an output request of a series of image data from a user via the operating unit 150 by using the above-described attribute information obtained in advance from the server 170 during acquisition of the series of image data. In this way, the control unit 110 functions also as an operation control unit to perform control so that an output request of image data can be accepted from a user by using attribute information obtained prior to acquisition of the image data, the control being performed in parallel with acquisition of the image data from the server 170.

When the control unit 110 accepts the output request of the image data from the user via the operating unit 150 before acquisition of the series of image data is completed, the control unit 110 holds the output request. Then, after acquisition of the series of image data has been completed, the control unit 110 allows the printer unit 104 to output the series of image data in response to the output request held therein. In this way, the control unit 110 functions also as an output control unit.

The control unit 110 obtains a plurality of series of image data and a plurality of pieces of attribute information corresponding to the image data from the server 170. In this embodiment, the data to be obtained from the server 170 corresponds to backup data of the data stored in the hard disk 160. The data obtained from the server 170 is stored in the hard disk 160 and can be used in the image forming apparatus 100. That is, the hard disk 160 functions as a restoring unit for various data to be obtained from an external apparatus.

Figure 2:
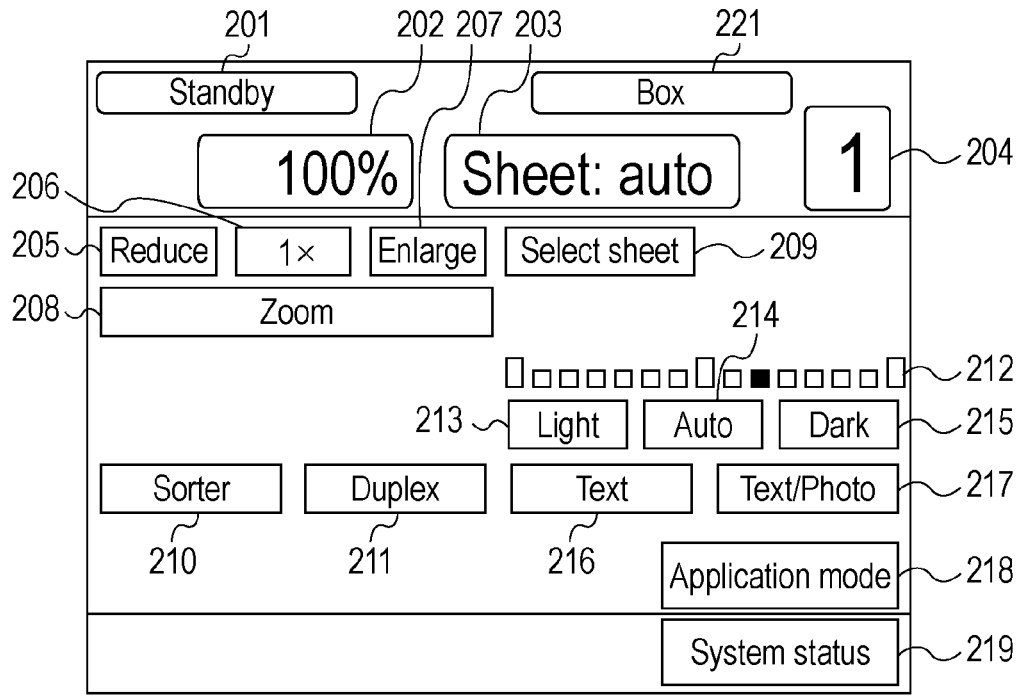
FIG. 2 illustrates a display screen displayed in an operating unit.

FIG. 2 illustrates an operation screen displayed in the operating unit 150. In a default state after turn-on of the image forming apparatus 100, the operation screen of a copying function illustrated in FIG. 2 is displayed as a reference screen. In the operation screen, a message line 201 displays a message indicating a copy job status. A magnification field 202 displays a magnification (%) set by a user or automatically set according to a copy mode. A sheet size field 203 displays a selected type of sheet to be output. For example, when auto selection is set, a message "auto" is displayed. A number-of-copies field 204 indicates the number of copies to be made. A reduce key 205 is used to perform reduced-scale copy. A 1× magnification key 206 is used to reset the magnification. An enlarge key 207 is used to perform enlarged-scale copy. A zoom key 208 is used to finely set the magnification for reduced- or enlarged-scale copy. A sheet selection key 209 is used to select a type of sheet to be output. A sorter key 210 is used to set various finishing functions, such as sorting or stapling. A duplex key 211 is used to set a duplex mode. A density indicator 212 indicates present density, in which the left side corresponds to light and the right side corresponds to dark. The density indicator 212 is associated with a light key 213 and a dark key 215. An auto key 214 is used to set a mode to automatically determine the density. A text key 216 is used to set a text mode automatically setting a density suitable for copying a text document. A text/photo key 217 is used to set a text/photo mode automatically setting a density suitable for copying a document including both characters and a photo. An application mode key 218 is used to set various copy modes that cannot be set on the copy reference screen. A system status key 219 is used when a user wants to check a current status (various statuses, such as printing or scanning is being performed) of the image forming apparatus 100. A box key 221 is selected to use a box function.

The various display screens illustrated in FIGS. 2 to 4 and 6 to 10 are displayed in the operating unit 150 under control by the control unit 110.

The box function is a function using a plurality of data storing boxes (hereinafter referred to as boxes) that are virtually provided in the hard disk 160 for respective users. In this embodiment, 100 boxes in total are provided in the hard disk 160. With this function, the control unit 110 responds to instructions from a user input through the operating unit 150 and controls the hard disk 160 so as to store document data (a series of image data) of a job accepted from the reader unit 101 in a box selected by the user. Also, the control unit 110 controls the hard disk 160 so as to store document data of a job accepted from an external apparatus via the network 120 in a box specified by the user in response to instructions of the user input through a user interface of the external apparatus. Also, the control unit 110 allows the printer unit 104 to print document data stored in a box (box document) in an output form desired by the user in accordance with instructions from the user input through the operating unit 150. Also, the control unit 110 performs control so as to transmit the box document to an external apparatus desired by the user via the network 120 in response to instructions from the user input through the operating unit 150. In this way, the control unit 110 responds to a press of the box key 221 by a user and performs control so as to display a box function operation screen in the operating unit 150 so that the user can perform various box operations.

Figure 3:
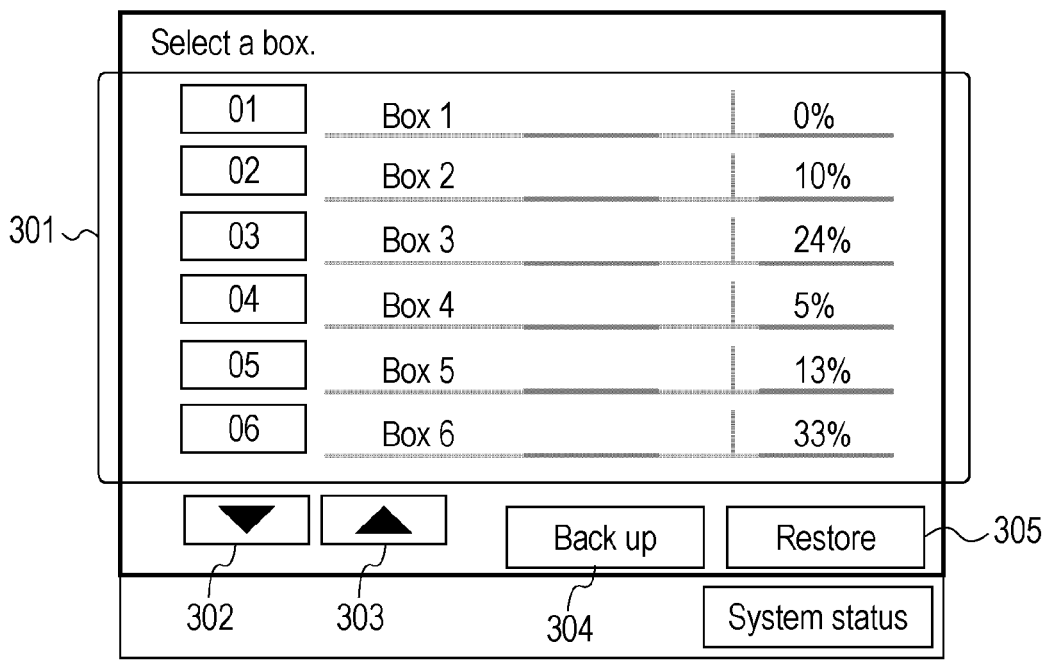
FIG. 3 illustrates a box selection screen.

FIG. 3 illustrates a box selection screen that is displayed in the operating unit 150 upon press of the box key 221 on the operation screen illustrated in FIG. 2 by a user. On this screen, the user can select a desired box from among a plurality of boxes.

A display area 301 is provided with box selection keys having box numbers of respective boxes, fields to display the names of the respective boxes, and fields to display information indicating the capacity of the respective boxes in a box area of the hard disk 160. Scroll keys 302 and 303 are used to scroll hidden boxes into view in the display area 301.

When a user presses a backup key 304, an operation of backing up document data stored in those boxes to the server specified by the user is performed in accordance with setting of backup/restoration described below. When the user presses a restore key 305, a restoring operation of obtaining the document data in those boxes backed up in the server is performed in accordance with the setting of backup/restoration described below.

The screen illustrated in FIG. 3 is an example of the box selection screen displayed in the operating unit 150 at the timing before the document data in the boxes is backed up to the server 170. That is, FIG. 3 illustrates an example of the box selection screen displayed in the operating unit 150 in a period when no image data is being obtained from the server 170.

Figure 4:
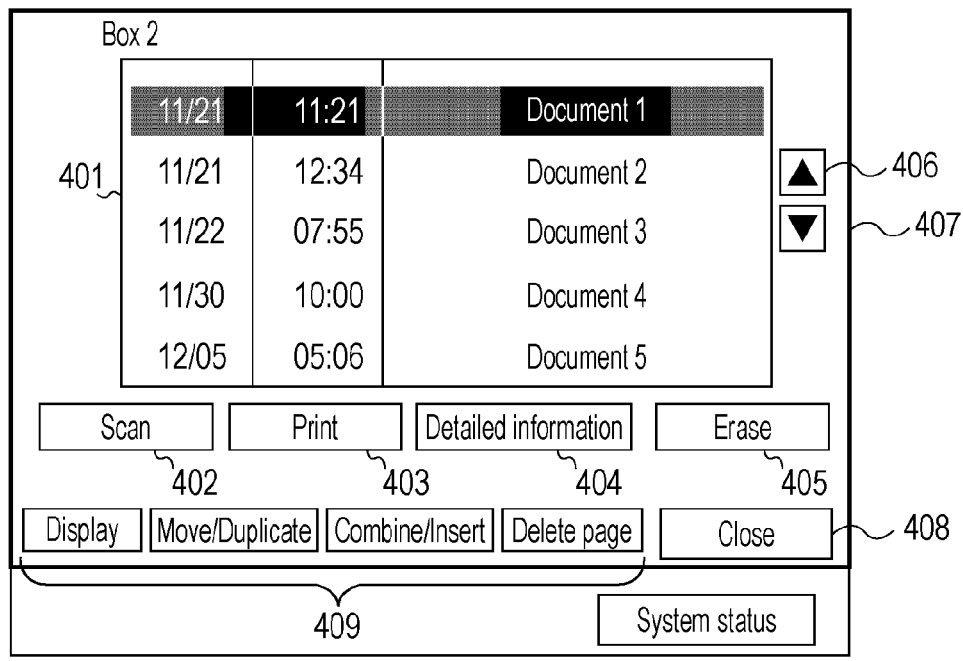
FIG. 4 illustrates a box document selection screen.

FIG. 4 illustrates a box document selection screen to select a document in the box selected on the box selection screen illustrated in FIG. 3. In this case, the box No. 2 has been selected on the screen illustrated in FIG. 3.

In a box document selection list 401, a list of documents existing in this box is displayed. A user can select one or a plurality of documents in the box from the list. The information displayed in the list includes the date and time when each document was stored and the names of the documents, as illustrated in FIG. 4.

When the user wants to select a document, the user presses the name of the document in the list 401. The document selected by the user is highlighted as illustrated in FIG. 4. A scan key 402 is used to store a series of image data from the reader unit 101 in the currently selected box (the box No. 2 in the example in FIG. 4). A print key 403 is used to print the document selected from the list 401 by the user. A detailed information key 404 is used to display detailed information (e.g., the number of pages, the capacity of the document, and the print mode that is currently set) of the document selected from the list 401 by the user in the operating unit 150. An erase key 405 is used to erase the document selected from the list 401 by the user from the hard disk 160. Scroll keys 406 and 407 are used to scroll hidden documents existing in this box into view in the list 401. A close key 408 is used to return to the screen illustrated in FIG. 3.

An application operation instruction key group 409 includes a display key to allow the operating unit 105 to display an image of a document selected from the list 401 by the user. Also, the key group 409 includes a move/duplicate key to move a document selected from the list 401 by the user to another box or to make a duplicate. Also, the key group 409 includes a combine/insert key to perform a combining process or an inserting process among a plurality of documents selected from the list 401 and a page delete key to delete a specified page of a selected document.

The screen illustrated in FIG. 4 is an example of the box document selection screen displayed in the operating unit 150 at the timing before the document data in the boxes is backed up to the server 170. That is, FIG. 4 illustrates an example of the box document selection screen displayed in the operating unit 150 in a period when no image data is being obtained from the server 170.

Figure 5:
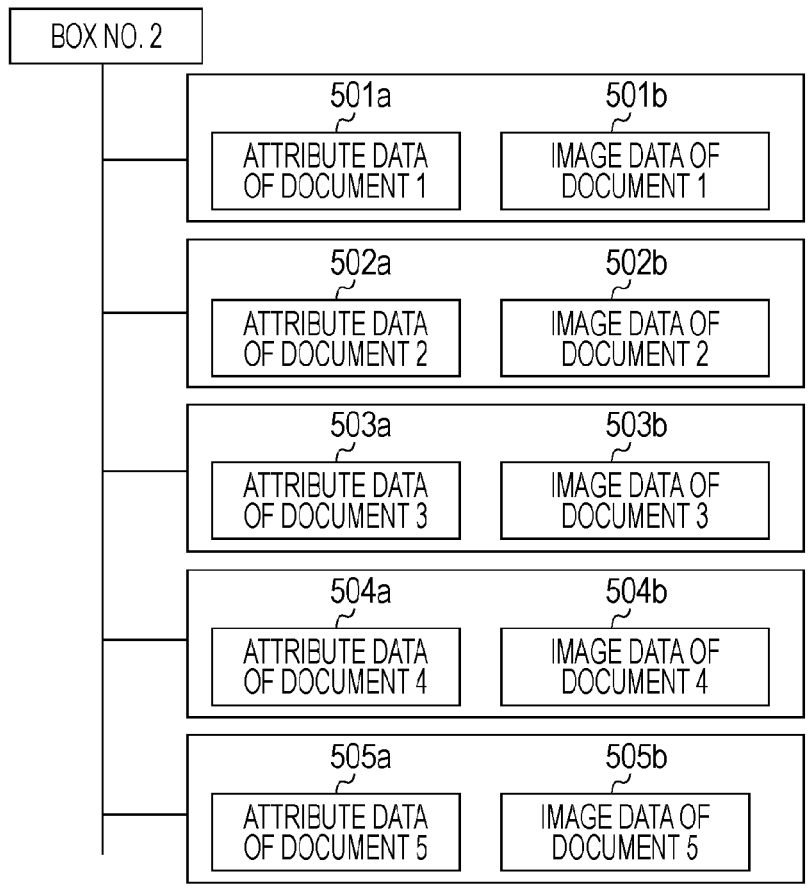
FIG. 5 illustrates a data structure of box documents.

FIG. 5 illustrates a data structure of the box documents stored in the hard disk 160. The hard disk 160 can store a plurality of series of image data (box documents) and a plurality of pieces of attribute information about the image data such that a plurality of boxes (100 boxes in this embodiment) are individually managed in units of boxes.

For example, assume that five documents, each including a plurality of pages, are stored in the box No. 2, as illustrated in FIG. 4. In this case, the data of those documents is managed in the hard disk 160 with the data structure illustrated in FIG. 5.

Reference numeral 501b in FIG. 5 denotes actual image data of document 1 in box 2. Attribute data 501a of document 1 about the series of image data 501b of document 1 is stored in the hard disk 160 while being associated with the image data 501b.

Likewise, in documents 2 to 5 in this box, actual image data 502b 503b, 504b, and 505b and attribute data 502a, 503a, 504a, and 505a are stored in the hard disk 160 while the respective documents are distinguished from each other.

Likewise, data in the other boxes is stored in the hard disk 160 in the management form illustrated in FIG. 5.

In this embodiment, the attribute data corresponds to attribute information about a series of image data of a plurality of pages. The attribute data includes information indicating the date and time when the document (a series of image data) corresponding to the attribute data was registered in the hard disk 160. Also, the attribute data includes information indicating the name of the document (document name displayed in the list 401) and information indicating the size of actual image data of the document. The attribute data 501a to 505a of the respective documents have a relatively small data size, whereas the actual image data 501b to 505b of the respective documents have a large data size. Thus, a large amount of attribute data can be processed in a shorter time than the time required to process the image data. In this embodiment, control is performed by using this characteristic.

In this embodiment, the series of image data in all the boxes and the attribute data thereof stored in the hard disk 160 in the above-described management form can be collectively stored (backed up) in a memory of a predetermined external apparatus. Furthermore, the series of image data in all the boxes and the attribute data thereof backed up in the memory of the external apparatus can be collectively stored again in the hard disk 160 (restored). A process of collectively backing up or restoring the box documents is realized in the image forming apparatus 100 when the control unit 110 controls the image forming apparatus 100 in response to instructions from the user input through the operating unit 150. This is described below with reference to FIG. 6.

Figure 6:
FIG. 6 illustrates a display screen to perform setting about backup/restoration.

FIG. 6 illustrates an operation screen to perform initial setting for a backup process or a restoring process of box data (corresponding to series of image data and attribute data of respective box documents in respective boxes) in the hard disk 160.

When a common specification setting key (not illustrated) of the operating unit 150 is pressed by a user, the control unit 110 allows the operating unit 150 to display the screen illustrated in FIG. 6.

The screen illustrated in FIG. 6 is provided with a host IP address setting field 601, a user name setting field 602, and a path to folder setting field 603. The user can set a backup destination (backup server) of a box document in the hard disk 160 on this screen.

The control unit 110 determines an external apparatus on the network 120 to which backup of the box data in the hard disk 160 is to be requested based on information set on the screen illustrated in FIG. 6. Also, the control unit 110 determines an external apparatus from which the box data is to be obtained to restore the box data to the hard disk 160 based on information set on the screen illustrated in FIG. 6. In this embodiment, it is assumed that the server 170 illustrated in FIG. 1 is set as an external apparatus required in the backup/restoring process by the user through the screen illustrated in FIG. 6.

After the backup destination has been set, the user can back up the box data at desired timing.

For example, after the above-described backup destination has been set, the control unit 110 enables acceptance of a backup request of box data from the user via the backup key 304 on the screen illustrated in FIG. 3. Upon press of the key 304 by the user, the control unit 110 requests a backup process to the server 170, registered as a backup destination on the screen illustrated in FIG. 6, via the network 120, and transfers the box data to the server 170. At this time, all the documents (series of image data) and all the attribute data stored in the respective 100 boxes are transferred to the server 170 via the network 120 and are stored in the memory of the server 170. In this example, the data in all the boxes is backed up, but the present invention is not limited to this. For example, only data in the box(es) selected by the user may be backed up to the server 170.

After the backup process has been completed, the user can obtain box data from the server 170 at desired timing.

For example, after the above-described backup process has been completed, the control unit 110 enables acceptance of a request for obtaining box data stored in the memory of the server 170 via the restore key 305 on the screen illustrated in FIG. 3. Then, upon press of the restore key 305 by the user, the control unit 110 issues a request for obtaining box data to the server 170, registered as a backup destination on the screen illustrated in FIG. 6, via the network 120. Accordingly, the control unit 110 obtains the above-described backed up box data from the server 170 via the network 120. At this time, all the box documents (series of image data) and all the attribute data backed up in the server 170 are transferred (downloaded) from the server 170 to the image forming apparatus 100 via the network 120 and are stored (restored) in the hard disk 160. In this example, the data in all the boxes is restored, but the present invention is not limited to this. For example, only the data in the box(es) selected by the user may be restored from the server 170 to the hard disk 160.

In this embodiment, data that has been backed up to the server 170 is erased from the hard disk 160. Alternatively, data that has been backed up may be held in the hard disk 160 and may be erased from the hard disk 160 just before restoration.

Hereinafter, operation control performed by the control unit 110 on the operating unit 150 during acquisition of the box data backed up to the server 170 from the server 170 is described.

In this embodiment, when the control unit 110 obtains box data from the server 170, the control unit 110 first obtains only the attribute data of the series of image data in the respective boxes sequentially from the box No. 1. Then, after obtaining the attribute data of all the box documents, the control unit 110 obtains the series of image data in the respective boxes sequentially from the box No. 1.

For example, with reference to FIG. 5, the control unit 110 obtains the five pieces of attribute data (501a to 505a) of documents 1 to 5 from the server 170, and then sequentially obtains series of image data (501b to 505b) of documents 1 to 5 from the server 170.

In this way, the control unit 110 obtains all the attribute data from the server 170 before obtaining the series of image data from the server 170. Then, the control unit 110 generates a box selection screen and a box document selection screen based on the obtained attribute data. Also, the control unit 110 updates displayed content of the box selection screen or the box document selection screen as necessary in accordance with an acquisition status of the attribute data or the series of image data.

Figure 7:
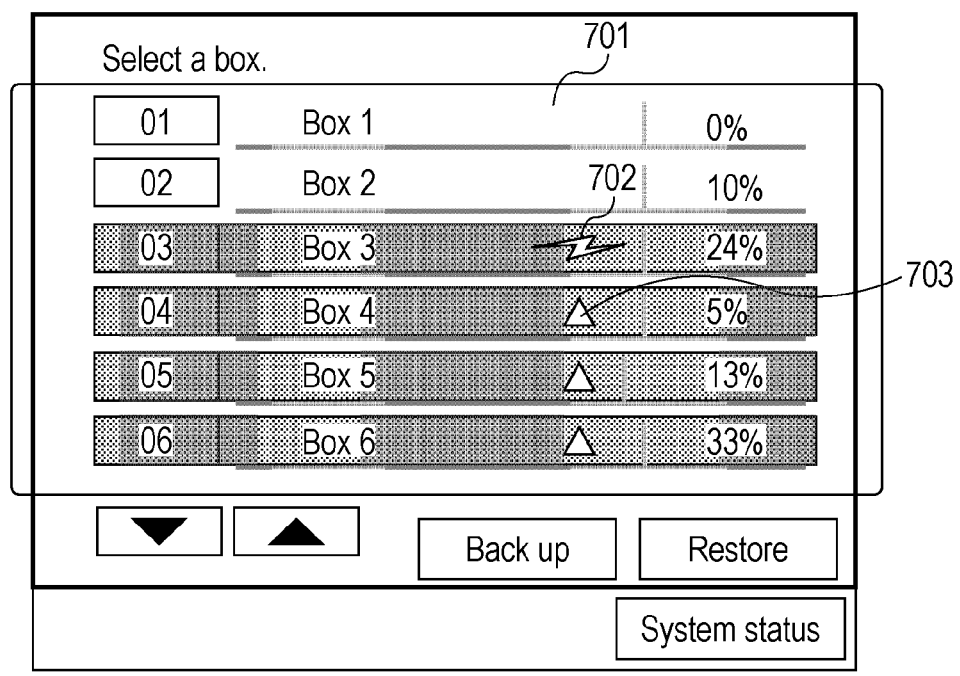
FIG. 7 illustrates a box selection screen displayed during acquisition of box data.

For example, if the box key 221 illustrated in FIG. 2 is pressed by the user during acquisition of box data from the server 170, the control unit 110 allows the operating unit 150 to display a box selection screen as illustrated in FIG. 7 as a box selection screen.

As can be understood from comparison between FIGS. 7 and 3, while the image forming apparatus 100 is obtaining box data from the server 170 (during restoration), the displayed content of the box selection screen is controlled so that the user can recognize an acquisition status in the respective boxes.

In this way, when the box selection screen is displayed in the operating unit 150 during acquisition of box data from the server 170, the control unit 110 performs control so that the box selection screen is generated or updated by using the attribute data obtained from the server 170.

For example, information indicating the names of the respective boxes and information indicating the capacity of the memory used by each box on the box selection screen illustrated in FIG. 7 are generated based on information about the attribute data of each box obtained from the server 170.

Also, when the box selection screen is displayed in the operating unit 150 during acquisition of box data from the server 170, the control unit 110 controls the operating unit 150 so that the displayed content is updated in real time in accordance with an acquisition status of box data from the server 170.

For example, displays 701, 702, and 703 illustrated in FIG. 7 are given to the respective boxes, and indicate a current acquisition status of the series of image data in each box to the user.

The display 701 enables the user to recognize that restoration of the series of image data of all the documents to be stored in the box has been completed. In this embodiment, the display 701 is realized by an ordinary display (not a special display like displays 702 and 703).

On the other hand, the display 702 enables the user to recognize that the series of image data of the documents to be stored in the box are now being restored (being downloaded from the server 170). In this embodiment, the display 702 is realized by shading on the box name and a symbol representing that communication is being performed.

The display 703 enables the user to recognize that the series of image data of the documents to be stored in the box have not been obtained from the server 170 and have not been restored. In this embodiment, the display 703 is realized by shading on the box name and a symbol representing "no image".

As described above, in this embodiment, the control unit 110 performs control so as to respond to instructions from the user input through the box key 221 and to display a box selection screen on which an acquisition status of box data is reflected even during acquisition of the box data from the server 170.

Also, the control unit 110 performs control so that a box document selection screen specified by the user can be displayed via the box selection screen in the special display form as illustrated in FIG. 7 even during acquisition of the box data from the server 170.

Accordingly, the user can select a desired box on the box selection screen illustrated in FIG. 7 even during acquisition of box data from the server 170.

For example, assume that the box No. 2 is selected by the user on the box selection screen illustrated in FIG. 7. In this case, the control unit 110 performs control so that the display in the operating unit 150 is changed from the screen illustrated in FIG. 7 to the screen illustrated in FIG. 8 in parallel with a process of obtaining box data from the server 170. In this way, even during acquisition of the box data from the server 170, the document selection screen of the box selected by the user can be displayed in the operating unit 150.

Figure 8:
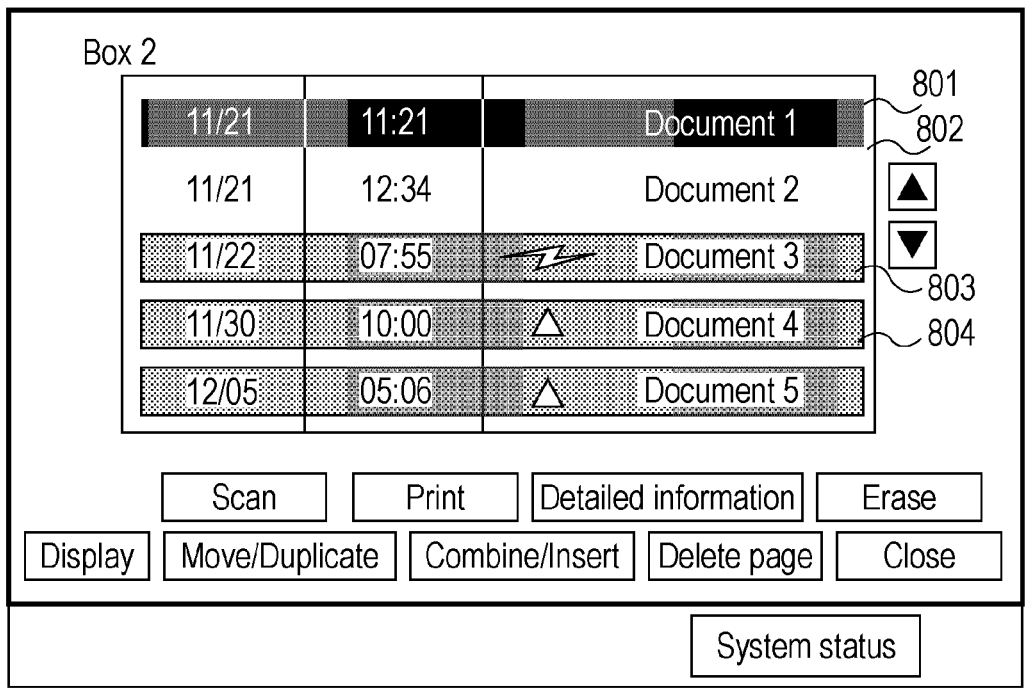
FIG. 8 illustrates a box document selection screen displayed during acquisition of box data.

As can be understood from comparison between FIGS. 8 and 4, while the image forming apparatus 100 is obtaining box data from the server 170 (during restoration), the displayed content of the box document selection screen is controlled so that the user can recognize an acquisition status in each document.

In this way, when a box document selection screen is displayed in the operating unit 150 during acquisition of box data from the server 170, the control unit 110 performs control so that the box document selection screen is generated or updated by using the attribute data obtained from the server 170.

For example, information indicating the names of respective documents and information indicating the date and time when the respective documents were stored on the box document selection screen illustrated in FIG. 8 are generated based on the attribute data of the respective documents obtained from the server 170.

The screen illustrated in FIG. 8 is displayed when the box No. 2 is selected on the screen illustrated in FIG. 7. In order to display the box document selection screen of box No. 2, the control unit 110 uses the attribute data 501a to 501b of documents 1 to 5 in the box No. 2 illustrated in FIG. 5 in the attribute data obtained from the server 170.

Also, when a box document selection screen is displayed in the operating unit 150 during acquisition of box data, the control unit 110 performs control so that the displayed content of the screen is updated in real time in accordance with an acquisition status of the box data from the server 170.

For example, displays 801, 802, 803, and 804 are given to respective box documents (respective series of image data) and notify the user of a current acquisition status of the series of image data.

The display 801 enables the user to recognize that restoration of image data of all the pages included in the document has been completed and that the document is now selected as a document to be output on this screen.

The display 802 enables the user to recognize that restoration of image data of all the pages included in the document has been completed and that the document is not selected as a document to be output on this screen.

The displays 801 and 802 are different from each other, that is, the display 801 is highlighted while the display 802 is not highlighted. But the both displays do not use a special display unlike the displays 803 and 804 so as to indicate that restoration of image data of all the pages in the respective documents has been completed.

On the other hand, the display 803 enables the user to recognize that the series of image data of the document is now being restored (being downloaded from the server 170). In this embodiment, the display 803 has shading in the display area corresponding to this document and a communication mark (symbol representing that communication is being performed).

The display 804 enables the user to recognize that any page of the series of image data of the document has not been obtained from the server 170 and that restoration has not been completed. In this embodiment, the display 804 has shading on the name of the document and a symbol representing "no image".

As described above, in this embodiment, the control unit 110 performs control so as to display a box document selection screen on which a box data acquisition status is reflected in accordance with selection of a box on a box selection screen by the user even during acquisition of box data from the server 170.

Also, the control unit 110 performs control so that an output request of the series of image data of a document desired by the user can be accepted from the user via the box document selection screen in the special display form as illustrated in FIG. 8 even during acquisition of box data from the server 170. This point is described below with reference to FIGS. 8 to 10.

First, on the screen illustrated in FIG. 8, document 1 stored in the box No. 2 is selected. All the pages of the series of image data of document 1 have been obtained from the server 170 and stored in the hard disk 160. That is, all the pages of the actual image data of document 1 have been restored.

As in the case illustrated in FIG. 8, if all the pages of the image data of the document selected on the box document selection screen have been obtained from the server 170, the control unit 110 performs control so that operation instruction keys for the document are displayed in an ordinary effective display state. For example, in FIG. 8, the print key and the application operation instruction key group described above with reference to FIG. 4 are displayed in the operating unit 150 in an ordinary effective display state.

Then, upon press of the print key on the screen illustrated in FIG. 8 by the user, the control unit 110 performs control so as to immediately read the series of image data of document 1 selected on the screen illustrated in FIG. 8 from the hard disk 160 and to allow the printer unit 104 to print the image data. Likewise, upon press of any of the operation instruction keys, the control unit 110 performs control so as to immediately read the series of image data of document 1 from the hard disk 160 and to perform a process according to the instructions from the user in the image forming apparatus 100.

In this embodiment, the control unit 110 performs control so that an operation of outputting a document of which image data has been restored, as the above-described document 1, can be performed on the box document selection screen in parallel with an operation of obtaining box data from the server 170.

Furthermore, in this embodiment, the control unit 110 performs control so that the user can perform an operation of outputting a box document of which image data has not been restored on the box document selection screen in parallel with an operation of obtaining box data from the server 170.

For example, on the box document selection screen illustrated in FIG. 8, the user can select an arbitrary box document from among box documents 1 to 5. At this time, the user can select a box document of which image data has not been restored on this screen. For example, assume that document 3, of which image data is now being restored, is selected by the user on the box document selection screen. In this case, the control unit 110 performs control so as to change the display on the box document selection screen from the screen illustrated in FIG. 8 to that illustrated in FIG. 9.

Figure 9:
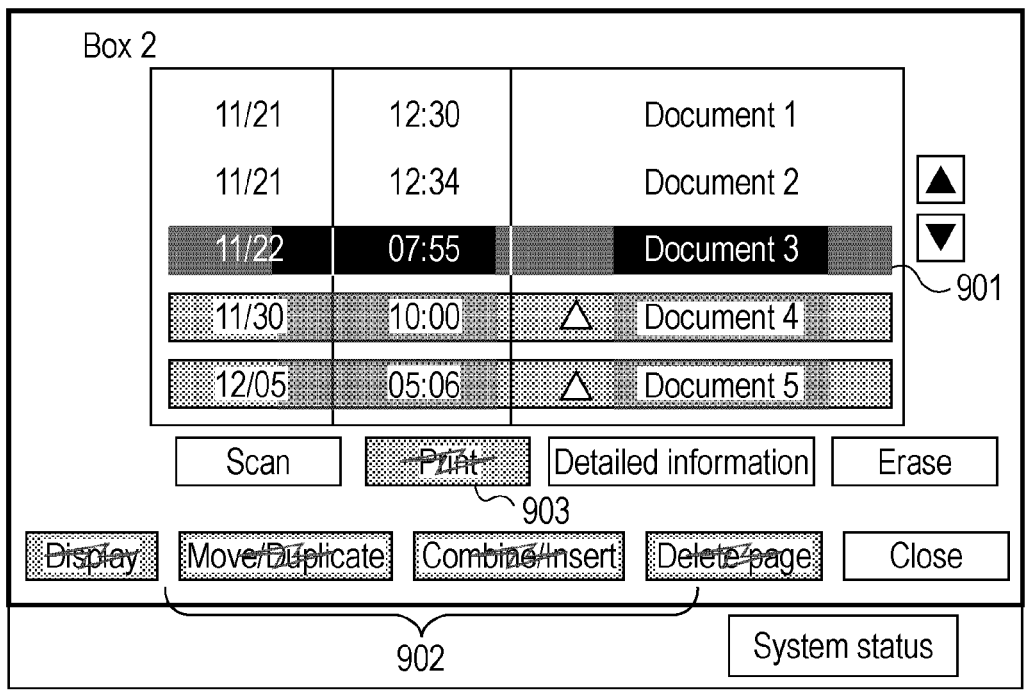
FIG. 9 illustrates a box document selection screen displayed during acquisition of box data.

FIG. 9 corresponds to a case where the user has selected document 3, of which series of image data is now being obtained from the server 170, on the box document selection screen. As illustrated in FIG. 9, the display of document 3 is highlighted upon being selected, as indicated by reference numeral 901.

As in the case illustrated in FIG. 9, assume that the document selected on the box document selection screen is a document in which not all the pages of the image data have been obtained from the server 170. In this embodiment, the control unit 110 performs control so that various instructions from the user to this document that has not completely been restored can be accepted via this screen. For example, in the case illustrated in FIG. 9, the control unit 110 enables acceptance of instructions provided through the print key or the application operation instruction key group illustrated in FIG. 4.

However, in the case illustrated in FIG. 9, acquisition of the image data of the document selected on the box document selection screen has not been completed. Thus, the control unit 110 performs control so that those operation instruction keys (indicated by reference numerals 902 and 903 in FIG. 9) are displayed in a special form different from an ordinary effective form.

For example, in the example illustrated in FIG. 9, the control unit 110 performs control so that those operation instruction keys (902 and 903) are shaded or superimposed by a communication mark (symbol representing that communication is being performed). Accordingly, the user can easily recognize that restoration of the image data of document 3 has not been completed prior to various processes performed on document 3.

Then, assume that the control unit 110 accepts a print request (output request) of the series of image data of document 3 in accordance with press of the print key 903 on the screen illustrated in FIG. 9 by the user. In this case, the control unit 110 allows the operating unit 150 to display a confirmation screen 1001 illustrated in FIG. 10.

Figure 10:
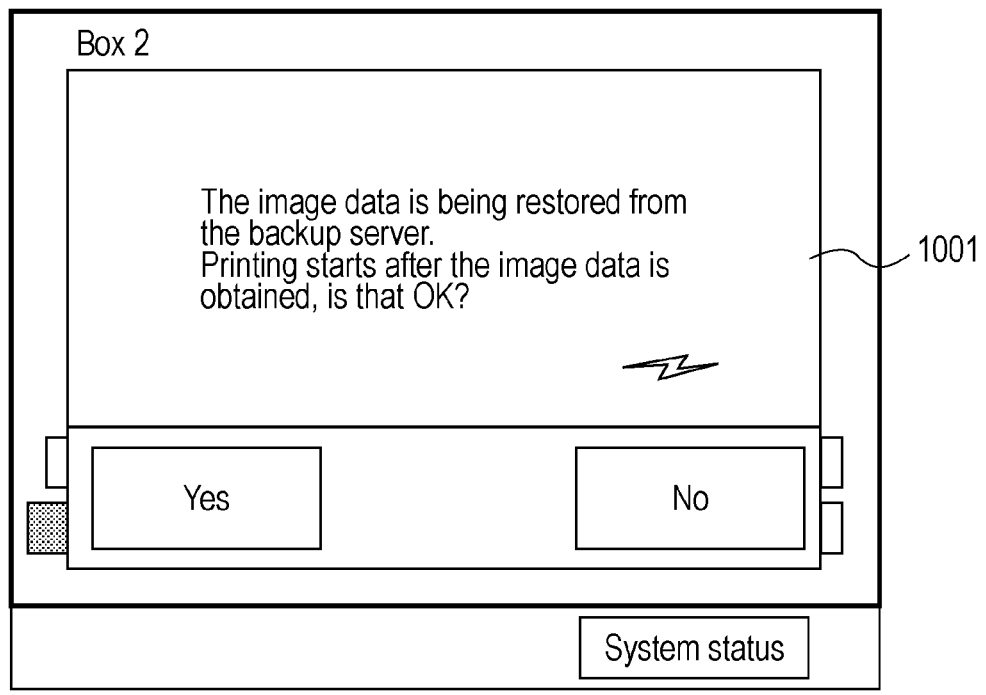
FIG. 10 illustrates a confirmation screen displayed after a user has selected a document of which image data has not been obtained.

The screen 1001 illustrated in FIG. 10 is constituted to notify the user that the series of image data of the box document which the user wants to output is now being obtained (restored) from the server 170. Also, the screen 1001 is constituted so that the user can determine to output or not to output the series of image data of this box document after reading the notification.

For example, if the user presses the "No" key on the screen 1001, the control unit 110 controls the image forming apparatus 100 so as to discard the print request of the series of image data of box document 3 and to cancel printing of the series of image data.

On the other hand, if the user presses the "Yes" key on the screen 1001, the control unit 110 formally accepts the print request of the series of image data of document 3 and holds the print request. Then, after obtaining all the pages of the series of image data of document 3 from the server 170 (after restoration completes), the control unit 110 allows the printer unit 104 to print the series of image data in response to the print request.

As described above, in this embodiment, the user can select a box document of which series of image data has not been obtained from the server 170 on the box document selection screen even during acquisition of box data from the server 170.

Then, after accepting an output request of the series of image data of the selected document from the user via the screen, the control unit 110 holds the output request. Then, after all the pages of the series of image data have been obtained from the server 170 (downloaded to the hard disk 160 has been completed), the series of image data can be output in the image forming apparatus 100.

The above-described process can also be applied when the user requests display of document 3 by pressing the display key on the screen illustrated in FIG. 9 as an output request for document 3 selected on the screen illustrated in FIG. 9.

In that case, for example, a confirmation screen (not illustrated) as that illustrated in FIG. 10 is displayed in the operating unit 150, a display request is formally accepted from the user via this screen, and then the control unit 110 holds the display request. Then, after obtaining all the pages of the series of image data of document 3, the control unit 110 performs control so as to allow the operating unit 150 to preview the series of image data.

Alternatively, a transmission key may be provided on the box document selection screen, and a transmission request of a box document of which series of image data has not been obtained from the server 170 may be accepted through press of the transmission key. In that case, too, the transmission request is held until all the pages of the series of image data have been obtained. Then, after all the pages have been obtained, the control unit 110 performs control so that the series of image data is transmitted to a destination set in the operating unit 150 via the network 120.

Also, instructions provided through the move/duplicate key, the combine/insert key, or the delete page key on the box document selection screen illustrated in FIG. 9 can be accepted as another processing request to the document of which series of image data has not been obtained from the server 170. In this case, too, the control unit 110 holds the processing request from the user until the series of image data has been obtained. After all the pages of the series of image data have been obtained, the control unit 110 controls the image forming apparatus 100 so as to perform a process corresponding to the request on the series of image data.

In the above-described example, document 3 that is being restored is used as an example of a job in which the series of image data has not been obtained, but documents 4 and 5 on the screen illustrated in FIG. 9 can be processed in the same manner. Documents 4 and 5 are jobs in which restoration has not started (any page of the series of image data has not been obtained from the server 170). Such a job can also be processed in the same manner as described above as a job in which acquisition of the series of image data has not been completed.

In the display illustrated in FIG. 9, box documents 3 to 5 correspond to documents of which series of image data has not been obtained from the server 170. However, at least attribute data of those documents has been obtained from the server 170.

As described above, the control unit 110 obtains attribute data of each box document from the server 170 prior to acquisition of the series of image data of each box document from the server 170. Then, the control unit 110 performs control so as to generate a box document selection screen by using the obtained attribute data. The image forming apparatus 100 according to this embodiment is configured in this manner.

That is, the display illustrated in FIG. 9 corresponds to a case of displaying a document selection screen of the box No. 2 after all the attribute data of documents 1 to 5 (501a, 502a, 503a, 504a, and 505a in FIG. 5) have been downloaded from the server 170 to the hard disk 160.

In this embodiment, the order of backing up the series of image data of the respective box documents to the server 170 and the order of obtaining the series of image data from the server 170 (restoration order) are based on the order of storing the data in the hard disk 160.

For example, referring to FIG. 4, a plurality of documents, each including a plurality of pages, are stored in the box No. 2 in the order of document 1, document 2, document 3, document 4, and document 5. In this case, the backup order of the series of image data is 501b, 502b, 503b, 504b, and 505b in FIG. 5. Also, the order of restoring the series of image data from the server 170 by the control unit 110 is 501b, 502b, 503b, 504b, and 505b.

However, the order of obtaining the series of image data of those box documents from the server 170 is dynamically changed in accordance with a selection status (selection result) of a box document by the user on the box document selection screen that is displayed during acquisition of box data.

For example, in the display illustrated in FIG. 9, all the pages of the series of image data of documents 1 and 2 have been obtained (restored). The series of image data of document 3 is now being obtained (restored) from the server 170, and the series of image data of documents 4 and have not been obtained.

Under this condition, assume that document 5 is selected by the user from the list of the box document selection screen illustrated in FIG. 9 and that an output request of the series of image data of this document is issued by the user via the print key 903.

In this case, since the series of image data of document 3 is now being obtained, the control unit 110 first completes acquisition of the series of image data of document 3. Then, the control unit 110 changes the data acquisition order from the server 170 so as to obtain the series of image data of document 5 (505b in FIG. 5) prior to acquisition of the series of image data of document 4 (504b in FIG. 5).

For example, the control unit 110 holds the output request of the series of image data of document 5 while obtaining the series of image data of document 3. At the same time, the control unit 110 transmits a request for changing the acquisition order of the series of image data to the server 170 via the network 120. Accordingly, the control unit 110 can obtain the image data from the server 170 in the following order: the series of image data of document 5 (505b), and then the series of image data of document 4 (504b).

Then, after obtaining all the pages of the series of image data of document 5, the control unit 110 allows the printer unit 104 to start printing the series of image data based on the output request that has been held.

In this way, the series of image data of document 5, corresponding to a job in which the series of image data has not been obtained from the server 170, can be output quickly and accurately as much as possible, without causing a trouble such as lack of pages of the series of image data of document 3.

Hereinafter, operation control and output control about the above-described box documents are described with reference to the flowcharts illustrated in FIGS. 11 and 12.

Figure 11:
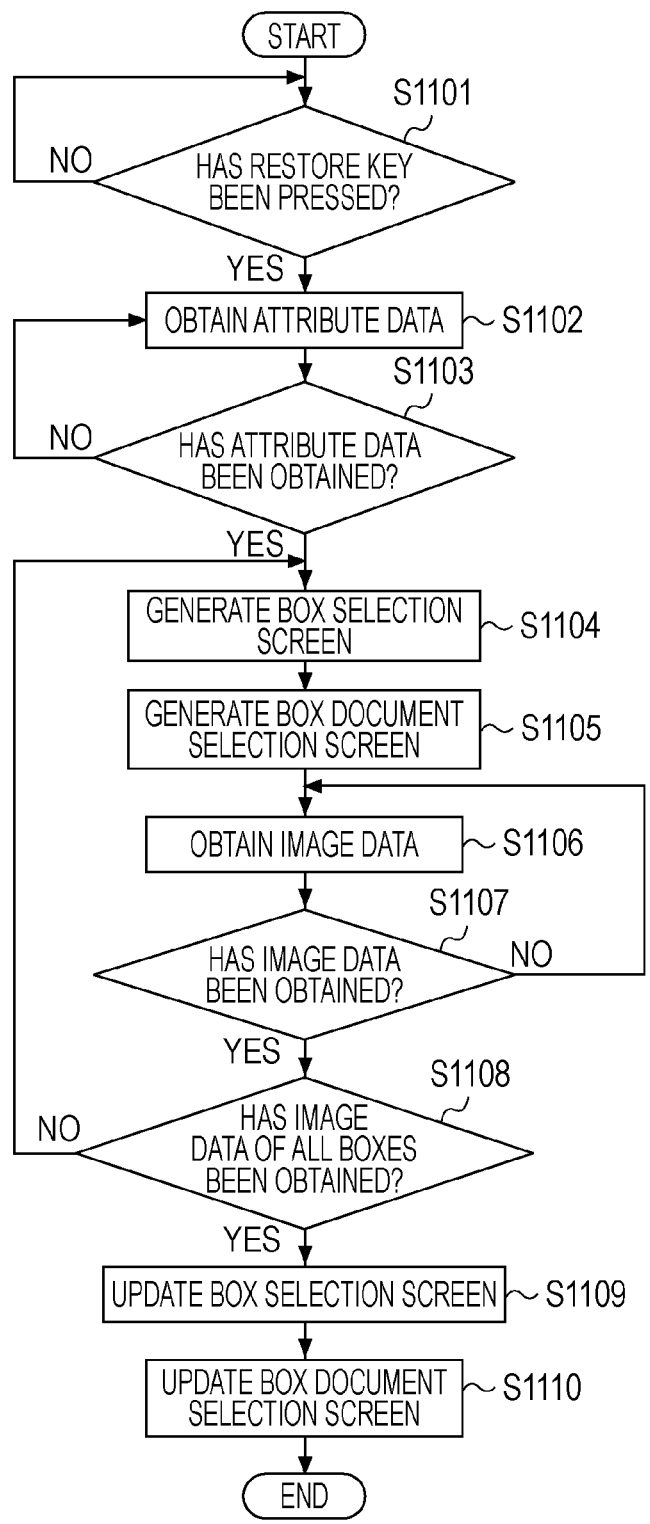
FIG. 11 is a flowchart illustrating a control procedure executed by a control unit.

FIG. 11 is a flowchart illustrating a control procedure of operation control performed by the control unit 110 on the operating unit 150 at the above-described restoration (at acquisition of box data from the server 170). The process of this flowchart is realized when the control unit 110 reads and executes a program stored in a predetermined memory. In FIG. 11, S1101 to S1110 denote respective steps.

First, in step S1101, the control unit 110 determines whether the restore key 305 illustrated in FIG. 3 has been pressed by the user. If the control unit 110 determines that the restore key 305 has been pressed (YES in step S1101), the process proceeds to step S1102.

In step S1102, the control unit 110 sequentially obtains the attribute data of the respective documents in the respective boxes from the server 170 via the network 120.

In step S1103, the control unit 110 determines whether all the attribute data of the respective documents in the respective boxes to be obtained from the server 170 have been obtained. If acquisition of the attribute data has not been completed (NO in step S1103), the process returns to step S1102 and acquisition of the attribute data is continued. On the other hand, if acquisition of the attribute data has been completed (YES in step 1103), the process proceeds from step S1103 to step S1104.

In step S1104, the control unit 110 controls the operating unit 150 so as to generate and update a box selection screen by using the attribute data of the respective documents in the respective boxes obtained in step S1102. This step corresponds to the operation described above with reference to FIG. 7.

Then, in step S1105, the control unit 110 controls the operating unit 150 so as to generate and update a box document selection screen by using the attribute data of the respective documents in the respective boxes obtained in step S1102. This step corresponds to the operation described above with reference to FIG. 8.

Then, in step S1106, the control unit 110 sequentially obtains the series of image data of the respective documents in the respective boxes from the server 170 via the network 120. Step S1106 is performed for each series of image data.

In step S1107, the control unit 110 determines whether all the pages of the series of image data to be obtained in step S1106 have been obtained. If acquisition of all the pages has not been completed (NO in step S1107), the process returns to step S1106 and acquisition of the series of image data is continued. On the other hand, after all the pages of the series of image data have been obtained (YES in step S1107), the process proceeds to step S1108.

In step S1108, the control unit 110 determines whether the series of image data of all the documents in all the boxes to be obtained from the server 170 have been obtained. If determination is "No", the process returns to step S1104 and steps S1104 to S1107 are repeated. On the other hand, if determination is "Yes" in step S1108, the process proceeds to step S1109.

In step S1109, the control unit 110 updates the box selection screen in accordance with completion of acquisition of all the image data. Then, in step S1110, the control unit 110 updates the box document selection screen in accordance with completion of acquisition of all the image data. After step S1110 has been performed, the process of this flowchart ends.

Figure 12:
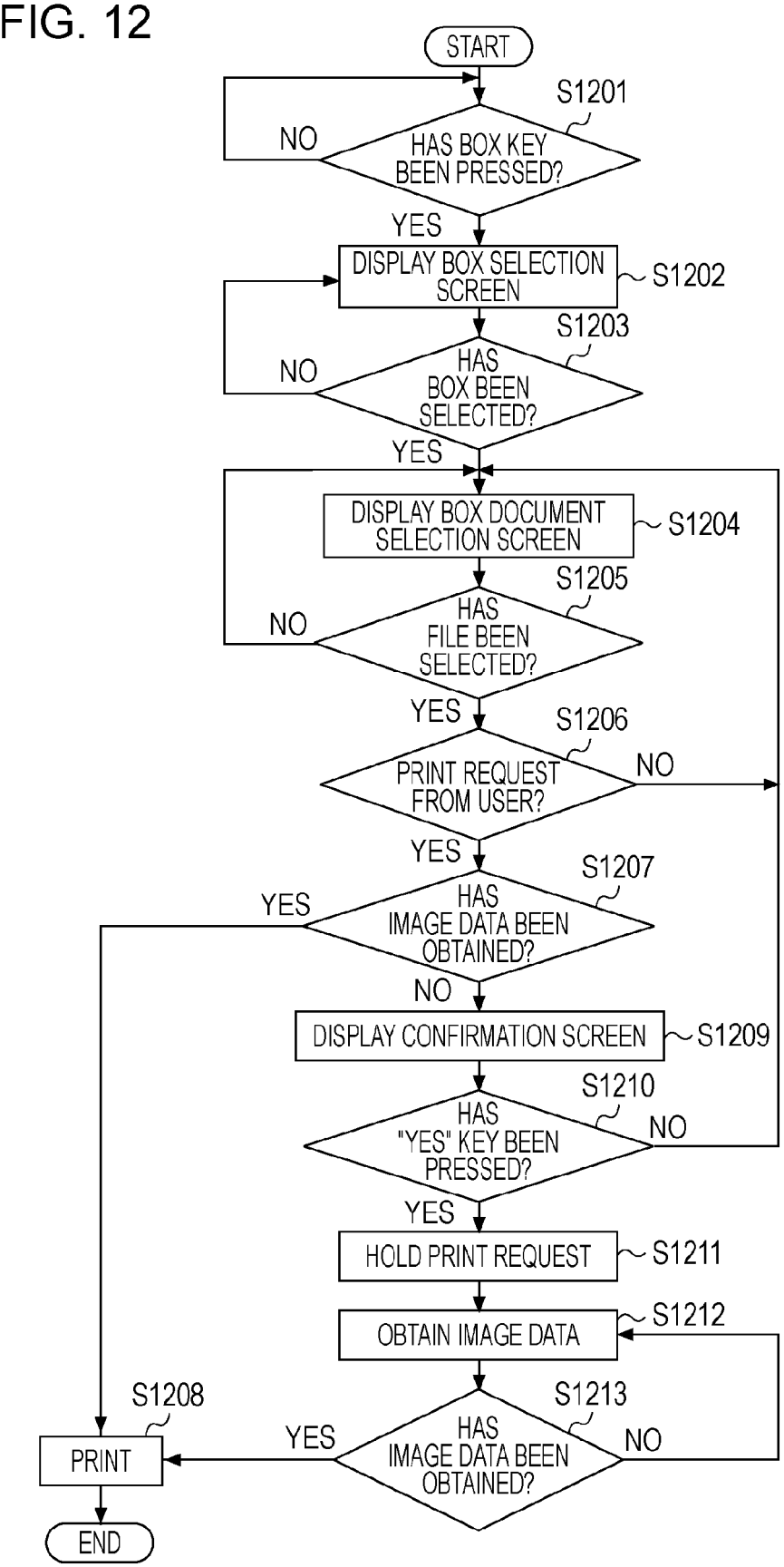
FIG. 12 is a flowchart illustrating a control procedure executed by the control unit.

FIG. 12 is a flowchart illustrating a control procedure of output control performed by the control unit 110 on the printer unit 104 at the above-described restoration (acquisition of box data from the server 170). The process of this flowchart is realized when the control unit 110 reads and executes a program stored in a memory. In FIG. 12, S1201 to S1213 denote respective steps. The process of the flowchart illustrated in FIG. 12 is performed during acquisition of box data from the server 170 in accordance with the process of the flowchart illustrated in FIG. 11.

First, in step S1201, the control unit 110 determines whether the box key 221 illustrated in FIG. 2 has been pressed by the user. If the control unit 110 determines that the box key 221 has been pressed (YES in step S1201), the process proceeds to step S1202.

In step S1202, the control unit 110 allows the operating unit 150 to display a box selection screen in response to the instructions from the key 221. This step corresponds to the operation described above with reference to FIG. 7.

More specifically, this step corresponds to an operation to display a box selection screen constituted based on the attribute data obtained from the server 170 in the operating unit 150 during acquisition of box data from the server 170.

In step S1203, the control unit 110 determines whether a box has been selected on the box selection screen by the user.

If the control unit 110 determines that any box has been selected by the user (YES in step S1203), the process proceeds to step S1204.

In step S1204, the control unit 110 allows the operating unit 150 to display a box document selection screen corresponding to the box selected on the box selection screen by the user. This step corresponds to the operation described above with reference to FIG. 8. That is, this step corresponds to an operation in the operating unit 150 to display a box document selection screen constituted based on the attribute data obtained from the server 170 during acquisition of box data from the server 170.

Then, in step S1205, the control unit 110 determines whether a box document (file) in this box has been selected on the box document selection screen by the user. If the control unit 110 determines that a document has been selected (YES in step S1205), the process proceeds to step S1206.

In step S1206, the control unit 110 determines whether a print request for the series of image data of the box document selected on the box document selection screen has been issued by the user. At this time, the control unit 110 makes determination based on whether the print key on the box document selection screen has been pressed. If determination in step S1206 is "No", the process returns to step S1204. On the other hand, if the determination in step S1206 is "Yes", the process proceeds to step S1207.

In step S1207, the control unit 110 determines whether all the pages of the series of image data of the box document to be printed have been obtained from the server 170 (restored to the hard disk 160).

If the control unit 110 determines that all the pages of the series of image data of the box document to be printed have been obtained (YES in step S1207), the process proceeds to step S1208. In step S1208, the control unit 110 performs control so as to immediately read the series of image data corresponding to the document to be printed from the hard disk 160 and to print the image data in the printer unit 104. This series of steps correspond to the above-described control performed by the control unit 110 when document 1 is selected on the screen illustrated in FIG. 8.

On the other hand, if the control unit 110 determines that all the pages of the series of image data of the box document to be printed have not been obtained from the server 170 (NO in step S1207), the process proceeds to step S1209.

In step S1209, the control unit 110 allows the operating unit 150 to display the confirmation screen illustrated in FIG. 10. Accordingly, the user is notified that all the pages of the series of image data of the box document to be printed have not been obtained from the server 170.

Then, in step S1210, the control unit 110 determines whether the "Yes" key on the confirmation screen 1001 has been pressed by the user. If the determination is "No", the process returns to step S1204. On the other hand, if the determination is "Yes", the process proceeds to step S1211.

In step S1211, the control unit 110 holds the print request of the series of image data of the box document.

In step S1212, the control unit 110 changes the acquisition order of a plurality of series of image data so that the series of image data of the selected box document is preferentially obtained from the server 170. If the document that is being restored is selected, the series of image data of the document is being obtained from the server 170, and thus the data acquisition order from the server 170 need not be changed. If the acquisition order of the image data is changed in step S1212, the acquisition order of the image data in step S1106 in FIG. 11 is also adjusted.

Then, in step S1213, the control unit 110 determines whether all the pages of the series of image data of the box document have been obtained. If the determination is "No", the process returns to step S1212 and acquisition of the series of image data is continued. On the other hand, if the control unit 110 determines that all the pages of the series of image data have been obtained (restoration has completed) (YES in step S1213), the process proceeds from step S1213 to step S1208. In step S1208, the control unit 110 performs control so as to print the series of image data of the box document obtained in step S1212 in the printer unit 104 in response to the print request held in step S1211. After step S1208, the process of this flowchart ends.

Steps S1209 to S1213 and S1208 performed in accordance with "No" determination in step S1207 correspond to the above-described control performed by the control unit 110 in the case where box document 3 or 5 is selected, described above with reference to FIGS. 9 and 10.

As described above, in this embodiment, the control unit 110 obtains attribute data of the series of image data from the server 170 via the network 120 prior to acquisition of the series of image data from the server 170.

During acquisition of the series of image data from the server 170, the control unit 110 enables acceptance of an output request of the series of image data from the user via the operating unit 150 by using the obtained attribute data.

In accordance with the acceptance of the output request from the user via the operating unit 150 before acquisition of the series of image data is completed, the control unit 110 holds the output request. Then, after acquisition of the series of image data has been completed, the control unit 110 performs control so as to output the series of image data by the printer unit 104 in response to the output request that has been held.

The control unit 110 allows the printer unit 104 to start outputting the series of image data in response to the output request after all the pages of the series of image data have been obtained. This is because the following problem can occur if image data is output every time a page of the image data is obtained from an external apparatus, and such a problem should be prevented.

For example, more time than expected by a user is required to output image data due to the size of obtained image data or traffic of the network to obtain the image data from an external apparatus. Also, time to output image data varies in units of pages. Such circumstances may impose extra stress on the user.

Furthermore, network failure or the like causes undesired output. For example, an entire set of pages of image data may not be output.

The image forming apparatus 100 of this embodiment is configured to avoid the above-described problems.

In this embodiment, the control unit 110 allows the operating unit 150 to display a display screen that is configured to accept an output request of image data from the user before acquisition of the series of image data is completed. This corresponds to the control described above with reference to FIG. 9, performed when document 3 or 5 is selected on the box document selection screen.

As described above with reference to FIG. 8, the box document selection screen is configured to be able to accept an output request from the user even after acquisition of the series of image data has been completed.

As described above with reference to FIGS. 7 to 9, the control unit 110 performs control to update the displayed content of the box document selection screen in accordance with an acquisition status of the series of image data from the server 170 so that the user can recognize whether acquisition of the series of image data has been completed.

Also, as described above, the control unit 110 obtains a plurality of pieces of attribute data corresponding to a plurality of series of image data from an external apparatus via the network 120 prior to acquisition of the plurality of series of image data from the external apparatus. While obtaining the plurality of series of image data, the control unit 110 enables acceptance of an output request of the image data selected by the user from among the plurality of series of image data by using the plurality of pieces of attribute data. Then, the control unit 110 allows the printer unit 104 to output the series of image data selected by the user after obtaining the series of image data.

In this embodiment, the control unit 110 controls the operating unit 150 so as to display a screen enabling the user to select desired image data from among a plurality of series of image data including image data that has not been obtained from the server 170. Furthermore, the control unit 110 controls the operating unit 150 so as to display a screen including an option constituted so that the user can recognize that acquisition of the series of image data has not been completed and an option constituted so that the user can recognize that acquisition of the series of image data has been completed. Also, the control unit 110 allows the user to select desired image data from among the plurality of series of image data via this screen. This corresponds to the control described above with reference to FIG. 8.

Also, the control unit 110 performs control so that the acquisition order of the plurality of series of image data to be obtained from the server 170 is changed in accordance with a selection result of image data by the user on the box selection screen that is displayed during acquisition of box data is from the server 170.

With this configuration, a mechanism capable of immediately accepting an output request of a series of image data obtained from an external apparatus from a user and outputting the series of image data desired by the user more accurately from the image forming apparatus 100 can be provided. Furthermore, with the above-described configuration, output desired by the user can be performed without imposing extra stress on the user and without causing the above-described problems.

In the above-described configuration, the box document selection screen can be displayed after all the attribute data have been obtained from the server 170. Alternatively, the control unit 110 may perform control so that the box document selection screen can be displayed in the operating unit 150 before obtaining all the attribute data from the server 170.

For example, assume that the attribute data of documents 1 to 3 (501a, 502a, and 503a in FIG. 5) have been obtained from the server 170 at the time when the box document selection screen of box No. 2 is displayed in the operating unit 150, but that the attribute data of documents 4 and 5 (504a and 505a in FIG. 5) have not been obtained from the server 170.

In that case, the control unit 110 performs control so as to display a box document selection screen of box No. 2 in which three options of documents 1 to 3 are included in a list (corresponds to 401 in FIG. 4).

Then, after obtaining the attribute data of document 4 (504a in FIG. 5), the control unit 110 updates the displayed content of the box document selection screen by adding an option of document 4 as a fourth option to the list. Likewise, after obtaining the attribute data of document 5 (505a in FIG. 5), the control unit 110 further updates the displayed content of the box document selection screen by adding an option of document 5 as a fifth option to the list.

In this way, the control unit 110 performs control to update the displayed content of the box document selection screen in real time in accordance with an acquisition status of attribute data from the server 170.

With this configuration, the control unit 110 performs control to update the displayed content of the box selection screen in real time in accordance with an acquisition status of attribute data from the server 170.

In that case, the processing procedure of the flowchart illustrated in FIG. 11 is partly changed. For example, step S1103 between steps S1102 and S1104 is moved between steps S1105 and S1106. Other than that, the above-described configuration can be applied.

With this configuration, operation can be performed more quickly than in the above-described configuration and the effect of the above-described configuration can be further enhanced.

In this embodiment, the control unit 110 functions as a first obtaining unit, a second obtaining unit, an operation control unit, and an output control unit. However, part of the functions corresponding to those units may be shared by units other than the control unit 110. For example, the functions of the first and second obtaining units may be assigned to an external I/F unit (not illustrated in FIG. 1) and the external I/F unit may be controlled by the control unit 110. In this way, a configuration equivalent to that described above can be realized.

In this embodiment, the control unit 110 transmits predetermined commands to a display control unit (not illustrated) in the operating unit 150 so as to display the above-described various operation screens on a touch panel of the operating unit 150. Then, the display control unit generates bitmap data of the operation screen and displays it on the touch panel. The control unit 110 performs such control on the operating unit 150. However, other configurations can also be applied. For example, the control unit 110 may generate the bitmap data of the operation screen and transfer the data to the operating unit 150. Accordingly, the operating unit 150 may display the above-described various operation screens on the touch panel.

Alternatively, a configuration equivalent to the above-described configuration may be realized by operation/controlling the image forming apparatus 100 from a remote site via the network 120.

For example, an external apparatus (the server 170 in this example) or another external apparatus (the host computer 180 in this example) controls the image forming apparatus 100, capable of obtaining series of image data and attribute data of respective boxes from the external apparatus, from a remote site in the following manner. In the following description, the external apparatus as a source of box data is called "external apparatus A", whereas the external apparatus that controls the image forming apparatus 100 from a remote site is called "external apparatus B".

First, the external apparatus B controls the image forming apparatus 100 so that the image forming apparatus 100 obtains attribute data about a series of image data from the external apparatus A via a communication medium before the image forming apparatus 100 obtains the series of image data from the external apparatus A.

Then, the external apparatus B controls the image forming apparatus 100 or the operating unit of the external apparatus B so that the image forming apparatus 100 can accept a request for outputting the series of image data from the user by using the attribute data while the image forming apparatus 100 is obtaining the series of image data.

Then, the output request accepted from the user via the operating unit before completion of acquisition of the series of image data is held, and the series of image data is output from the image forming apparatus 100 in response to the output request after completion of acquisition of the series of image data. In this way, the external apparatus B controls the image forming apparatus 100.

The above-described configuration can also be applied to this embodiment.

<Another Configuration>

The various functions of the above-described embodiment may be carried out by an external apparatus (e.g., the server 170 or the host computer 180) capable of performing data communication with the image forming apparatus 100 based on a program installed from the outside. In that case, data used to display the same screens as those described above in the embodiment is installed from the outside so that the above-described various user interfaces can be provided on the display unit of the host computer.

Here, a computer-readable storage medium storing a program (including program code of software) allowing a computer to execute the functions (control method) of the above-described embodiment is supplied to a system or an apparatus. Then, a computer (CPU or MPU) of the system or the apparatus reads and executes the program code stored in the storage medium. Accordingly, the present invention can be carried out. In that case, the program code read from the storage medium realizes a new function of the present invention, and thus the storage medium storing the program code constitutes the present invention. The form of the program is not specified as long as it has a function of the program. For example, object code, a program executed by an interpreter, or script data supplied to an OS (operating system) can be used.

Examples of the storage medium to supply the program include a flexible disk, a hard disk, an optical disc, a magneto-optical (MO) disc, a CD-ROM (compact disc read only memory), a CD-R (compact disc recordable), a CD-RW (compact disc rewritable), a magnetic tape, a nonvolatile memory card, a ROM, and a DVD (digital versatile disc). In this case, the program code read from the storage medium realizes the functions of the above-described embodiment, and thus the storage medium storing the program code constitutes the present invention.

Also, the following method can be used to supply the program. That is, the program can be supplied by accessing a web site on the Internet by using a browser of a client computer and downloading the computer program of the present invention or a compressed file having an automatic install function to a recording medium, such as a hard disk, from the web site. Alternatively, the program code constituting the program of the present invention may be divided into a plurality of files, and the files can be downloaded from different web sites. That is, a WWW (World Wide Web) server or an ftp (file transfer protocol) server allowing a plurality of users to download the program files to realize the functional process of the present invention in a computer are included in the claims of the present invention.

Alternatively, the following method can be used. That is, the program of the present invention is encrypted, stored in storage media such as CD-ROMs, and distributed to users. Then, users satisfying a predetermined condition are allowed to download key information to decrypt the encrypted program from a web site via the Internet. Then, the users execute the encrypted program by using the key information and install the program into their computers.

Also, the functions of the above-described embodiment can be realized when a computer reads and executes the program code. Of course, the functions of the above-described embodiment can be realized when an OS operating on the computer executes part or all of actual processes.

Alternatively, the program code read from the storage medium may be written in a memory included in a function expansion board inserted into a computer or a function expansion unit connected to the computer. In this case, a CPU or the like included in the function expansion board or the function expansion unit executes part or all of actual processes based on instructions of the program code. The functions of the above-described embodiment can be of course realized by this process.

The present invention can be applied to a system including a plurality of apparatuses or a single apparatus. Also, the present invention can be achieved by supplying the program to the system or the apparatus. In this case, the system or the apparatus can be provided with advantages of the present invention when the system or the apparatus reads the program expressed by software to achieve the present invention from the storage medium.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-173892 filed Jul. 2, 2007, which is hereby incorporated by reference herein in its entirety.

What is claimed is:

1. An apparatus which communicates with an external apparatus, comprising:
    an obtaining unit configured to obtain image data and attribute information of the image data from the external apparatus, wherein, after the attribute information has been obtained, the obtaining unit starts to obtain the image data from the external apparatus even before a user requests output of the image data;
    an outputting unit configured to output the image data obtained by the obtaining unit;
    an operation control unit configured to, while the obtaining unit is obtaining the image data from the external apparatus, enable acceptance of an output request of the image data from the user via an operating unit, by using the attribute information which has been obtained by the obtaining unit; and
    an output control unit configured to hold the output request before completion of obtaining the image data from the external apparatus and to control the outputting unit to output the image data in accordance with the output request after completion of obtaining the image data from the external apparatus.

2. The apparatus according to claim 1, wherein the outputting unit comprises a printer unit configured to print on a paper according to image data, and the output request is a print request to print the image data via the printer unit.

3. The apparatus according to claim 1, wherein the output control unit controls the outputting unit to start outputting the image data in accordance with the output request after completion of acquisition of a predetermined number of pages of the image data.

4. The apparatus according to claim 1, wherein, while the obtaining unit is obtaining the image data, the operation control unit controls the operating unit to display the attribute information so that the user can select the attribute information for the output request.

5. The apparatus according to claim 4, wherein the operating unit includes a display screen, and
wherein the display screen is capable of accepting the output request from the user even after completion of acquisition of the image data.

6. The apparatus according to claim 5, wherein the operation control unit performs control to update displayed content of the display screen in accordance with an acquisition status of the image data by the obtaining unit, and
wherein the user, based on the acquisition status, can determine whether acquisition of the image data by the obtaining unit has been completed.

7. The apparatus according to claim 1,
wherein the obtaining unit obtains a plurality of pieces of attribute information corresponding to a plurality of pieces of image data from the external apparatus and obtains the plurality of pieces of image data from the external apparatus,
wherein the operation control unit enables the acceptance of the output request of a piece of image data selected by the user from among the plurality of pieces of image data from the user via the operating unit, by using the plurality of pieces of attribute information obtained by the obtaining unit, while the obtaining unit is obtaining the plurality of pieces of image data, and
wherein the output control unit controls the outputting unit to output the piece of image data selected by the user via the operating unit after completion of acquisition of the image data.

8. The apparatus according to claim 7, wherein the operation control unit controls the operating unit to display a display screen including an option configured to enable the user to determine that acquisition of image data has not been completed and an option configured to enable the user to determine that acquisition of image data has been completed, so that the user can select any piece of image data from among the plurality of pieces of image data via the display screen.

9. The apparatus according to claim 7, wherein the obtaining unit changes an acquisition order of the plurality of pieces of image data in accordance with the selection of the image data by the operating unit.

10. A method for controlling an apparatus capable of obtaining attribute information of image data and the image data from an external apparatus, the method comprising:
controlling the apparatus to start obtaining the image data from the external apparatus, after the attribute information has been obtained, even before a user requests output of the image data;
enabling, while the image data is being obtained, an operating unit of the apparatus to accept an output request of the image data from the user, by using the attribute information which has been obtained from the external apparatus;
controlling the apparatus to hold the output request via the operating unit before completion of obtaining the image data from the external apparatus; and
controlling the apparatus to output the image data in accordance with the output request after completion of obtaining the image data from the external apparatus.

11. The method according to claim 10, wherein the output request is a print request to print the image data, and the apparatus outputs the image data by printing the image data on printing media.

12. A non-transitory computer-readable storage medium storing a program allowing a computer to execute the method according to claim 10.

13. An apparatus which communicates with an external apparatus, comprising:
an obtaining unit configured to obtain attribute information of image data corresponding to a plurality of pages from the external apparatus, and to obtain the image data corresponding to the plurality of pages from the external apparatus;
an operation control unit configured to, when the obtaining unit has obtained the image data corresponding to a portion of the plurality of pages from the external apparatus and has not obtained the image data corresponding to a remaining portion of the plurality of pages from the external apparatus, enable a user o request output of the image data corresponding to the plurality of pages, by using the attribute information which has been obtained by the obtaining unit; and
an outputting unit configured to output the image data corresponding to the plurality of pages which has been obtained by the obtaining unit in accordance with the output request, and
an output control unit configured to, if the user requests output of the image data corresponding to the plurality of pages which is being obtained by the obtaining unit, hold the output request and, if the image data corresponding to the plurality of pages has been obtained completely by the obtaining unit, control the outputting unit to output the image data corresponding to the plurality of pages which has been obtained by the obtaining unit in accordance with the held output request.

14. The apparatus according to claim 13, further comprising:
an operating unit configured to accept the output request from the user,
wherein, when the obtaining unit has obtained the image data corresponding to the portion of the plurality of pages from the external apparatus and has not obtained the image data corresponding to the remaining portion of the plurality of pages from the external apparatus the operation control unit controls the operating unit to display the attribute information of the image data corresponding to the plurality of pages so that the user is able to select the image data as image data to be output.

15. The apparatus according to claim 14, wherein
the obtaining unit obtains attribute information of a plurality of pieces of image data,
the operation control unit controls the operating unit to display the attribute information of the image data which has been obtained by the obtaining unit and the attribute information of the image data which is being obtained by the obtaining unit so that the user can select each of the image data which has been obtained by the obtaining unit and the image data which is being obtained by the obtaining unit as image data to be output.

16. The apparatus according to claim 15, wherein
even when the obtaining unit does not start to obtain the image data corresponding to the plurality of pages, the operation control unit controls the operating unit to display the attribute information obtained by the obtaining unit so that the user can select the image data which the obtaining unit does not start to obtain as the image data to be output.

17. The apparatus according to claim 14, wherein, the operation control unit controls the operating unit to display the attribute information obtained by the obtaining unit and information indicating that the obtaining unit is obtaining the image data corresponding to the plurality of pages.

18. The apparatus according to claim 14, wherein the operating unit is further configured to accept a selection of the image data from the user.

* * * * *